T. DOWLING.
ROW-LOCK.

No. 174,068. Patented Feb. 29, 1876.

Witnesses
S. W. Piper
L. W. Möller

Thomas Dowling
by his attorney
R. H. Eddy

UNITED STATES PATENT OFFICE.

THOMAS DOWLING, OF GLOUCESTER, MASSACHUSETTS, ASSIGNOR TO HIMSELF AND WILLIAM N. LEPAGE, OF SAME PLACE.

IMPROVEMENT IN ROWLOCKS.

Specification forming part of Letters Patent No. 174,068, dated February 29, 1876; application filed February 7, 1876.

*To all whom it may concern:*

Be it known that I, THOMAS DOWLING, of Gloucester, of the county of Essex and State of Massachusetts, have invented a new and useful Improvement in Boats' Rowlocks and their Supports; and do hereby declare the same to be fully described in the following specification and represented in the accompanying drawings, of which—

Figure 1:
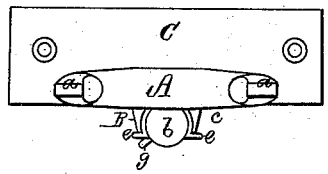
Figure 3:
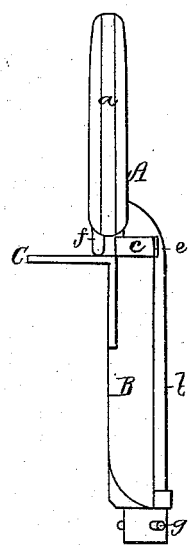
Figure 2:
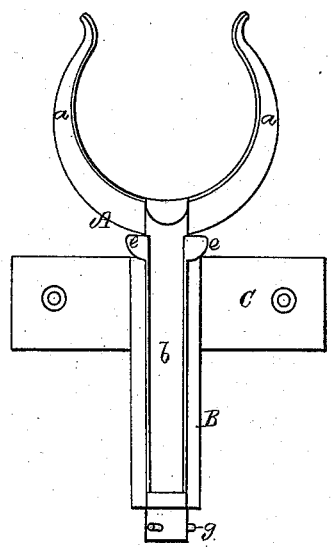
Figure 4:
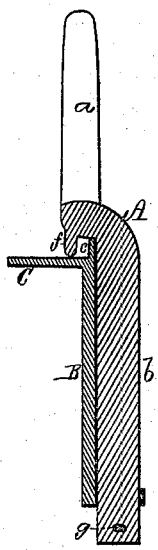

Figure 1 is a top view, Fig. 2 a front elevation, Fig. 3 an end view, and Fig. 4 a transverse section, of one of my improved rowlocks and its supporters.

In this rowlock the horns or prongs are arranged eccentrically with, or aside of, the shank, instead of being in the same plane with it, and the supporter is composed in part of a tube open at both ends, and slotted in front from near its lower end upward to its upper end. Furthermore, the slotted guide-tube of the shank is extended a short distance above its bracket, and such tube and the rowlock are provided with stops to determine the extent of rotary movement of the rowlock. The rowlock also has a stop to prevent it from being drawn out of its guide-tube.

Figure 5:
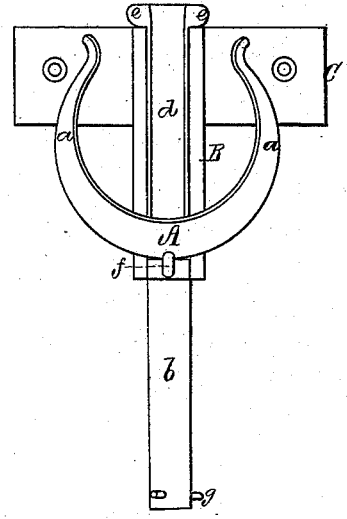

In the drawings, A denotes the rowlock, with its prongs *a a* arranged in and at their junction, fixed to the side of the shank *b*, so as to form at the bottom of the horns a shoulder, *c*, for supporting the rowlock on the top of its guide-tube when the said rowlock is in its higher position. The said guide-tube represented at B projects, as shown, from, and is fixed to, a bracket, C, for fastening it to the gunwale of a boat. The guide-tube from near its lower end up to its upper end is slotted, as shown at *d*, and it extends a short distance above the bracket, and at its top and near one side of the slot such tube has a small stop, *e*, extending from it. There also projects downward from the prongs of the rowlock, at their junction, a short stop, *f*, which, when the prongs are in a plane at right angles to the bracket, brings up against the stop *e*. Another stop, *g*, extending from the shank *b* at its foot, serves to prevent the shank from being drawn out of the guide-tube. The shank is circular in horizontal section, so as to enable it to be revolved in the guide-tube. On turning the rowlock around sufficiently it will drop down into the position as represented in Fig. 5—viz., below the top of the bracket—in which case its shoulder will rest on the lower end of the slot, and the rowlock will be below the gunwale of the boat. The object of having it in such position will be understood by mariners or boatmen.

I claim—

1. The rowlock A, having its prongs *a a* arranged aside of their shank *b*, substantially as represented.

2. I claim the combination of the rowlock A, having its prongs arranged aside of its shank, as shown, with its guide-tube B, arranged with such rowlock and slotted, as represented.

3. I claim the rowlock A, having its prongs arranged aside of its shank, and provided with the stop *f*, in combination with the guide-tube B, slotted and provided with the stop *e*, all being substantially as set forth.

4. I claim the rowlock A, having its prongs *a a* aside of its shank *b*, and such shank provided with the stop *g*, all being as shown and described.

5. I claim, in combination with the bracket C, the guide-tube B, fixed to and arranged to extend a short distance above such bracket, in combination with the rowlock A, having its prongs *a a* arranged aside of, and to project from, their shank *b*, and furnished with the shoulder *c*, to support them on the top of the guide-tube, all being substantially as shown and explained.

THOMAS DOWLING.

Witnesses:
JOHN D. WOODBURY,
WM. N. LE PAGE.